(12) United States Patent
Nicholas et al.

(10) Patent No.: US 8,984,244 B2
(45) Date of Patent: *Mar. 17, 2015

(54) CONCURRENT VIRTUAL MACHINE SNAPSHOTS AND RESTORE

(71) Applicant: Microsoft Corporation, Redmond, WA (US)

(72) Inventors: Andrew Ernest Nicholas, Sunnyvale, CA (US); Aaron S. Giles, Issaquah, WA (US); Eric P. Traut, Bellevue, WA (US); Idan Avraham, Kirkland, WA (US); Xiongjian Fu, Sammamish, WA (US); Osama M. Salem, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/079,535

(22) Filed: Nov. 13, 2013

(65) Prior Publication Data

US 2014/0075141 A1    Mar. 13, 2014

Related U.S. Application Data

(63) Continuation of application No. 11/487,031, filed on Jul. 13, 2006, now Pat. No. 8,607,009.

(51) Int. Cl.
*G06F 12/00* (2006.01)
*G06F 11/14* (2006.01)
(Continued)

(52) U.S. Cl.
CPC .......... *G06F 11/1469* (2013.01); *G06F 9/4418* (2013.01); *G06F 11/1482* (2013.01); *G06F 9/45558* (2013.01); *G06F 11/1438* (2013.01);
(Continued)

(58) Field of Classification Search
CPC .................................................. G06F 2201/84
USPC ........................................................ 711/6, 162
See application file for complete search history.

(56) References Cited

U.S. PATENT DOCUMENTS

| 5,224,214 A | 6/1993 | Rosich | |
|---|---|---|---|
| 5,390,315 A * | 2/1995 | Blandy et al. | 711/112 |

(Continued)

OTHER PUBLICATIONS

Anonymous. Invalid Page Faults. [online] Jul. 19, 2004, [retrieved on May 6, 2008]. Retrieved from the Internet: <URL:http://surecool.net/ipf.htm>.

(Continued)

*Primary Examiner* — Larry Mackall
(74) *Attorney, Agent, or Firm* — John Jardine; Kate Drakos; Micky Minhas

(57) ABSTRACT

Various mechanisms are disclosed herein for the saving and restoring of virtual machine environment state. For example, virtual machine state can be either be saved or (multiple) snapshots can be taken of the virtual machine state. In the latter case, virtual processors can be allowed to run while the memory of the virtual machine state is being saved. In either case, virtual devices associated with the virtual machine environment can be quiesced such that these devices can prepare themselves to be saved. Once such virtual devices and memory are saved, they can also be restored. For example, restoration of memory can occur while virtual processors are running at the same time. And, moreover, restoration can occur in batches of pages, thus optimizing the response time for restoring saved data.

20 Claims, 16 Drawing Sheets

(51) Int. Cl.
*G06F 9/44* (2006.01)
*G06F 9/455* (2006.01)

(52) U.S. Cl.
CPC ....... *G06F 2201/815* (2013.01); *G06F 2201/84* (2013.01); *G06F 2009/45575* (2013.01)
USPC .................. 711/162; 711/6; 711/E12.103

(56) References Cited

U.S. PATENT DOCUMENTS

| | | | |
|---|---|---|---|
| 5,752,036 | A | 5/1998 | Nakamura et al. |
| 6,594,744 | B1 | 7/2003 | Humlicek et al. |
| 6,704,764 | B1 | 3/2004 | Ottati |
| 6,732,220 | B2 | 5/2004 | Babaian et al. |
| 6,795,966 | B1 | 9/2004 | Lim et al. |
| 6,850,953 | B1 | 2/2005 | Deshpande et al. |
| 6,879,266 | B1* | 4/2005 | Dye et al. .................. 341/51 |
| 7,139,406 | B2 | 11/2006 | McClelland et al. |
| 7,299,468 | B2 | 11/2007 | Casey et al. |
| 7,313,793 | B2 | 12/2007 | Traut et al. |
| 7,506,265 | B1 | 3/2009 | Traut et al. |
| 8,607,009 | B2 | 12/2013 | Nicholas et al. |
| 2002/0029308 | A1 | 3/2002 | Babaian et al. |
| 2002/0087816 | A1* | 7/2002 | Atkinson et al. ............. 711/156 |
| 2002/0184287 | A1 | 12/2002 | Nunally |
| 2003/0033344 | A1 | 2/2003 | Abbott et al. |
| 2003/0182358 | A1 | 9/2003 | Rowley et al. |
| 2003/0187915 | A1 | 10/2003 | Sun et al. |
| 2004/0010787 | A1 | 1/2004 | Traut et al. |
| 2004/0221290 | A1 | 11/2004 | Casey et al. |
| 2005/0246505 | A1 | 11/2005 | McKenney et al. |
| 2005/0268298 | A1 | 12/2005 | Hunt et al. |
| 2006/0085784 | A1* | 4/2006 | Traut et al. .................. 718/1 |
| 2006/0085792 | A1 | 4/2006 | Traut |
| 2007/0220201 | A1 | 9/2007 | Gill et al. |

OTHER PUBLICATIONS

Russinovich et al. Microsoft Windows Internals 4th edition. [online] Dec. 8, 2004, [retrieved on May 6, 2008]. Retrieved from the Internet: <URL:http://book.itzero.com/read/microsoft/0507/Microsoft.Press. Micros-oft.Windows.Internals.Fourth.Edition.Dec.2004.internal. Fixed.eBook-DDU.sub- .-- html/0735619174/ch07lev1sec10. html>.

WMware. VMware GSX Server 3.1—Configuring Startup and Shutdown Options for Virtual Machines. [online] Oct. 23, 2004, [retrieved on May 5, 2008]. Retrieved from the Internet: <URL:http://www.vmware.com/support/gsx3/doc/manage.sub.--mui.sub.--sta- rtup.sub.--gsx.html>.

Kunapuli, Udaykumar. A Study of Swap Cache Based Prefetching to Improve Virtual Memory Performance. MS, University of Cincinnati, Engineering : Computer Engineering, Feb. 2002 [online], [retrieved on Apr. 4, 2011]. Retrieved from the Internet <http://etd.ohiolink.edu/view.cgi?acc.sub.--num=ucin1014063417>.

* cited by examiner

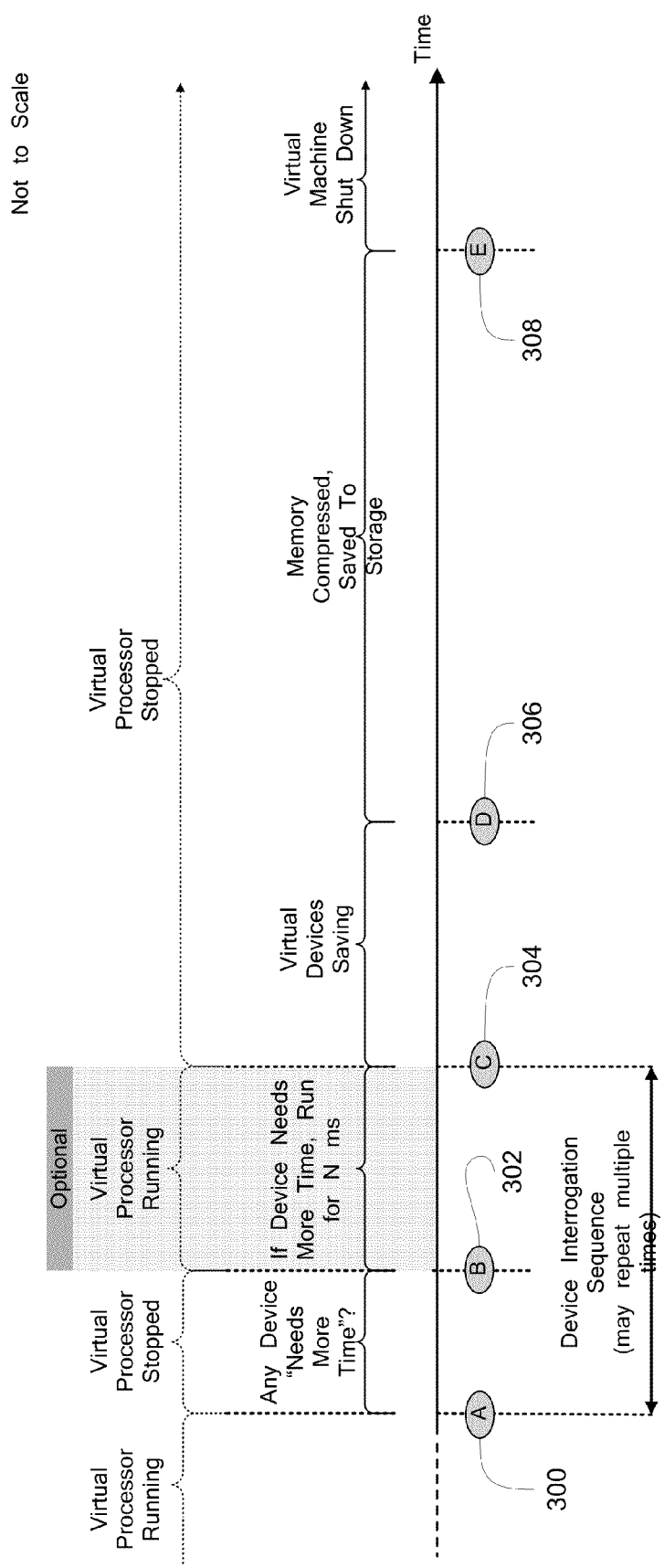
Prior Art  Fig. 3A

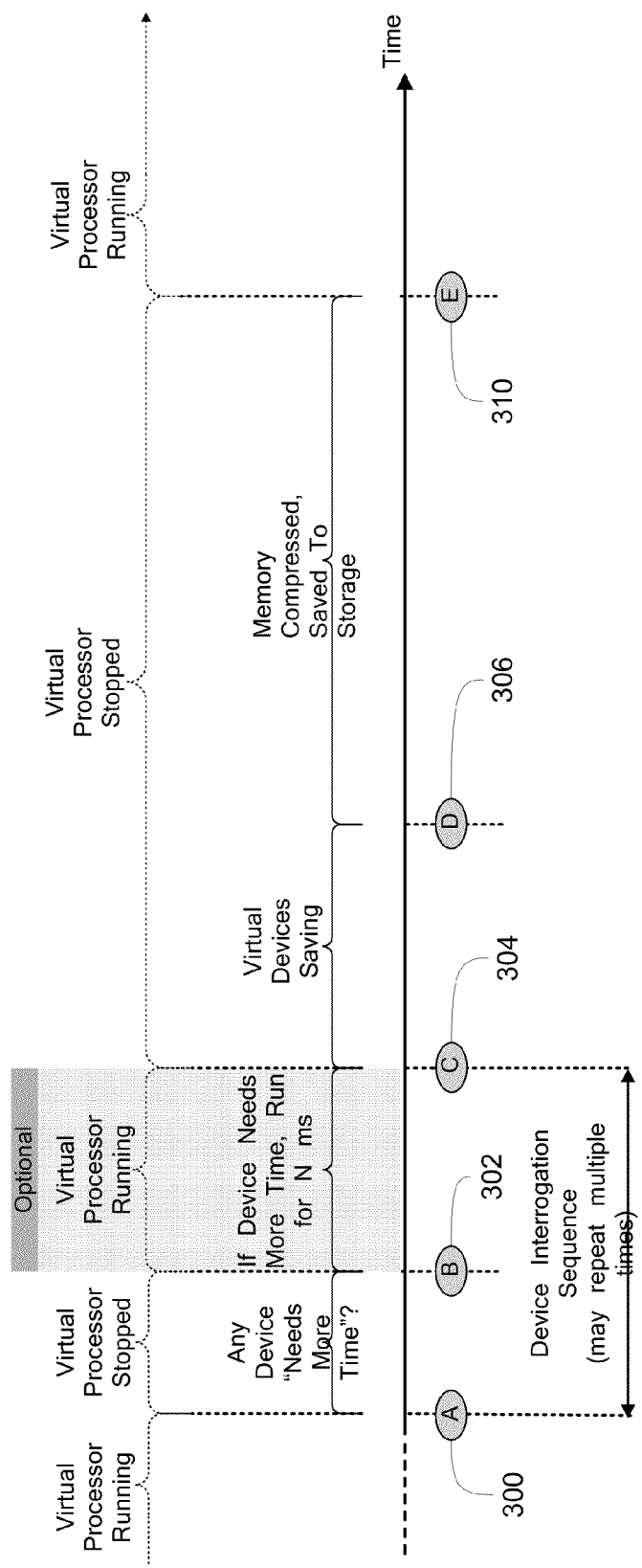
Prior Art Fig. 3B

Prior Art Fig. 6

CONCURRENT VIRTUAL MACHINE SNAPSHOTS AND RESTORE

CROSS REFERENCE TO RELATED APPLICATIONS

This application is a continuation of U.S. patent application Ser. No. 11/487,031, filed Jul. 13, 2006, now U.S. Pat. No. 8,607,009, Issued on Dec. 10, 2013, which is herein incorporated by reference in its entirety.

TECHNICAL FIELD

The present subject matter relates to the field of computing, and more particularly, to virtual machines, although virtual machines are merely an exemplary and non-limiting field of the presently disclosed subject matter.

BACKGROUND

Virtual machines allow for the running of multiple operating systems on one physical machine. Users of virtual machines may want to save the state of a virtual machine, or to take a snapshot (or multiple snapshots) of a virtual machine in order to preserve a virtual machine state (and perhaps, later in time, to get back to that state). The saving or taking snapshots of virtual machines is usually a time consuming process, since the memory of a typical virtual machine can be large—on the order of several gigabytes or more.

Specifically, preserving the state of virtual devices in virtual machines can be elongated if such virtual devices are busy while a save or a snapshot is taking place. Moreover, the preserving of virtual machine memory is even longer, typically overshadowing the preserving of virtual devices by several orders of magnitude of time. Compounding this problem is the fact that virtual processors are typically stopped while a save or a snapshot of memory is taking place.

Thus, it would be advantageous to provide mechanisms that could preserve the state of a virtual machine and resume the running of a virtual machine while the state-preserving process is still underway. It would also be advantageous to obviate the problem of a virtual machine potentially holding off the execution of a save or snapshot request for long periods of time (or forever) due to virtual devices being unable to preserve their state. Lastly, it would be advantageous to allow for efficient restoring mechanisms that would allow users to restore preserved virtual machine states.

SUMMARY

Various mechanisms are provided herein for preserving the state of a virtual machine environment. In one aspect of the presently disclosed subject matter, the state of virtual devices and virtual machine memory can be saved. In another aspect, snapshots of the virtual devices and the memory can be taken, such that virtual processors can continue running while the memory is being saved to storage. The virtual processors are allowed to run in this case because a copy-on-write method is used that copies pages to storage before any such pages are written to by any virtual device or processor.

In another aspect, the state of virtual devices and memory can be restored once is has been preserved. For example, pages in memory can be marked with intercepts that will issue any time a page in a memory is read from or written to. This allows for the restoring of memory while virtual processors are running. Any pages that these processors (or virtual devices) touch, will be paged in—in response to reading or writing. Such pages, moreover, can be paged in groups, making any restoration operation more efficient.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included:

FIG. 3A illustrates a prior art virtual machine save sequence, where the saving of virtual devices and memory requires virtual processors to be stopped and the virtual machine to be shut down;

FIG. 3B illustrates a prior art virtual machine snapshot sequence, where the saving of the virtual devices and memory requires virtual processors to be stopped, but this time, the virtual machine starts running again after the saving;

FIG. 8 illustrates one exemplary implementation of the presently discussed subject matter, where a virtual processor attempts to write to a page in memory, and where a control logic module copies such a page to storage before it is written on;

DETAILED DESCRIPTION OF ILLUSTRATIVE EMBODIMENTS

Virtual Machines in General Terms

Figure 1:
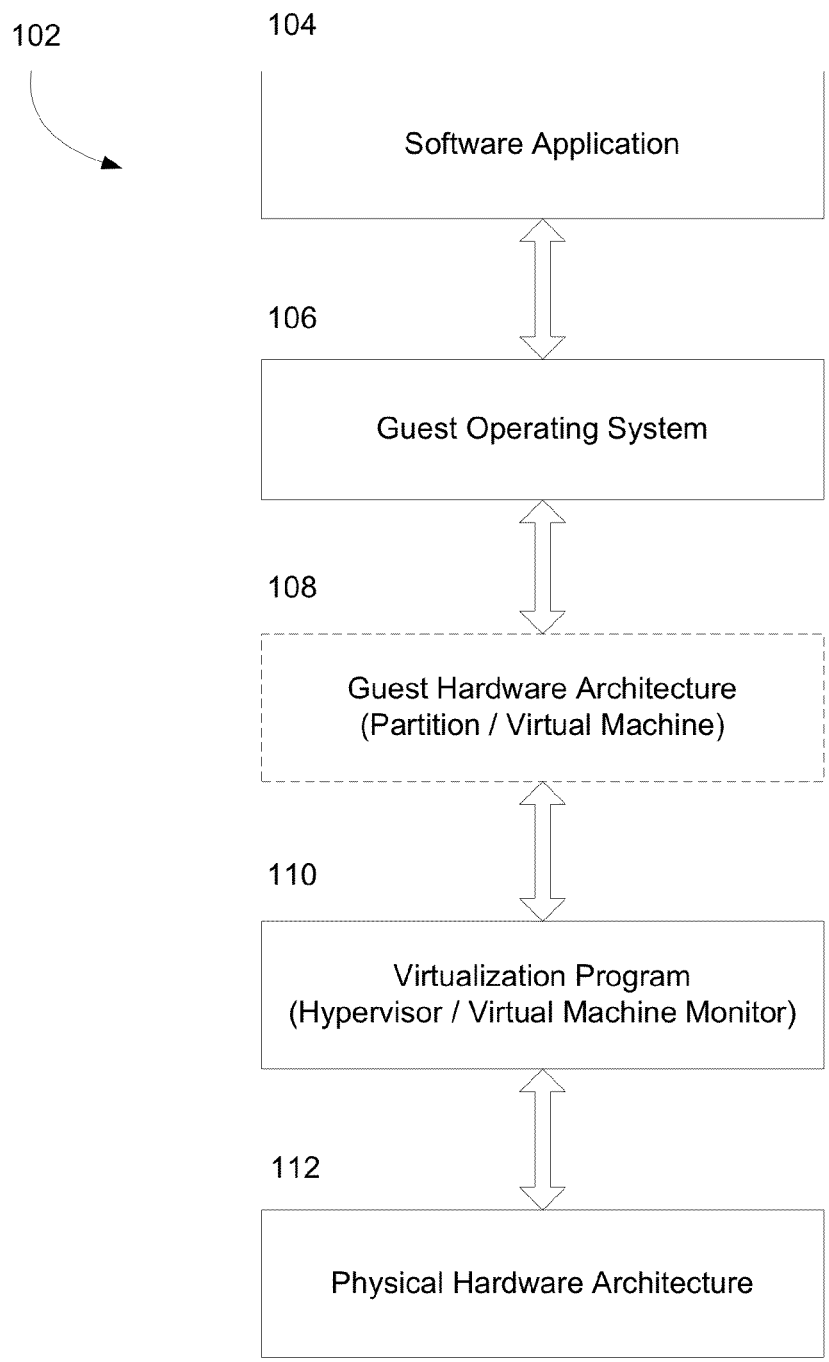
FIG. 1 is a block diagram representing the logical layering of the hardware and software architecture for virtualized operating environment in a computer system.

FIG. 1 is a diagram representing the logical layering of the hardware and software architecture for a virtualized environment in a computer system. In the figure, a virtualization program 110 runs directly or indirectly on the physical hardware architecture 112. The virtualization program 110 may be (a) a virtual machine monitor that runs alongside a host operating system or a host operating system with a hypervisor component wherein the hypervisor component performs the virtualization. The virtualization program 110 virtualizes a guest hardware architecture 108 (shown as dashed lines to illustrate the fact that this component is a partition or a "virtual machine"), that is, hardware that does not actually exist but is instead virtualized by the virtualizing program 110. A guest operating system 106 executes on the guest hardware architecture 108, and a software application 104 can run on the guest operating system 106. In the virtualized operating environment of FIG. 1, the software application 104 can run in a computer system 102 even if the software application 104 is designed to run on an operating system that is generally incompatible with a host operating system and the hardware architecture 112.

Figure 2A:
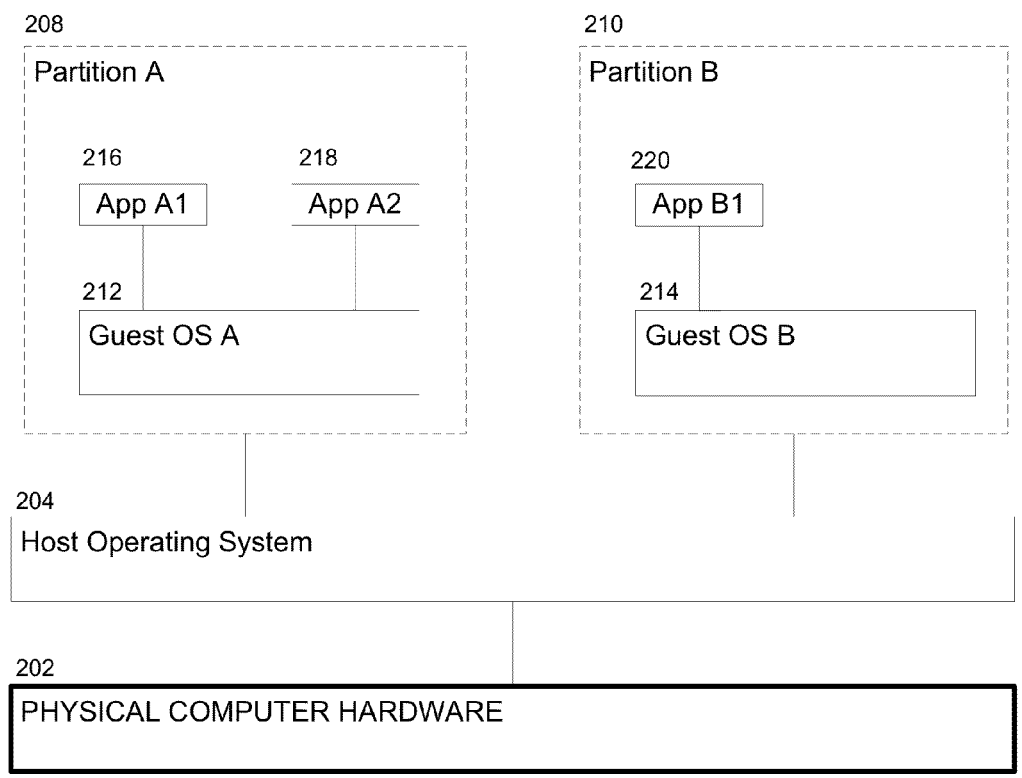
FIG. 2A is a block diagram representing a virtualized computing system wherein the virtualization is performed by the host operating system (either directly or via a hypervisor)

Next, FIG. 2A illustrates a virtualized computing system comprising a host operating system (host OS) software layer 204 running directly above physical computer hardware 202, where the host OS 204 provides access to the resources of the physical computer hardware 202 by exposing interfaces to partitions A 208 and B 210 for the use by operating systems A and B, 212 and 214, respectively. This enables the host OS 204 to go unnoticed by operating system layers 212 and 214 running above it. Again, to perform the virtualization, the host OS 204 may be a specially designed operating system with native virtualization capabilities or, alternately, it may be a standard operating system with an incorporated hypervisor component for performing the virtualization (not shown).

Referring again to FIG. 2A, above the host OS 204 are two partitions, partition A 208, which may be, for example, a virtualized Intel 386 processor, and partition B 210, which may be, for example, a virtualized version of one of the Motorola 680X0 family of processors. Within each partition 208 and 210 are guest operating systems (guest OSs) A 212 and B 214, respectively. Running on top of guest OS A 212 are two applications, application A1 216 and application A2 218, and running on top of guest OS B 214 is application B1 220.

In regard to FIG. 2A, it is important to note that partition A 208 and partition B 214 (which are shown in dashed lines) are virtualized computer hardware representations that exist only as software constructions. They are made possible due to the execution of specialized virtualization software(s) that not only presents partition A 208 and partition B 210 to Guest OS A 212 and Guest OS B 214, respectively, but which also performs all of the software steps necessary for Guest OS A 212 and Guest OS B 214 to indirectly interact with the real physical computer hardware 202.

Figure 2B:
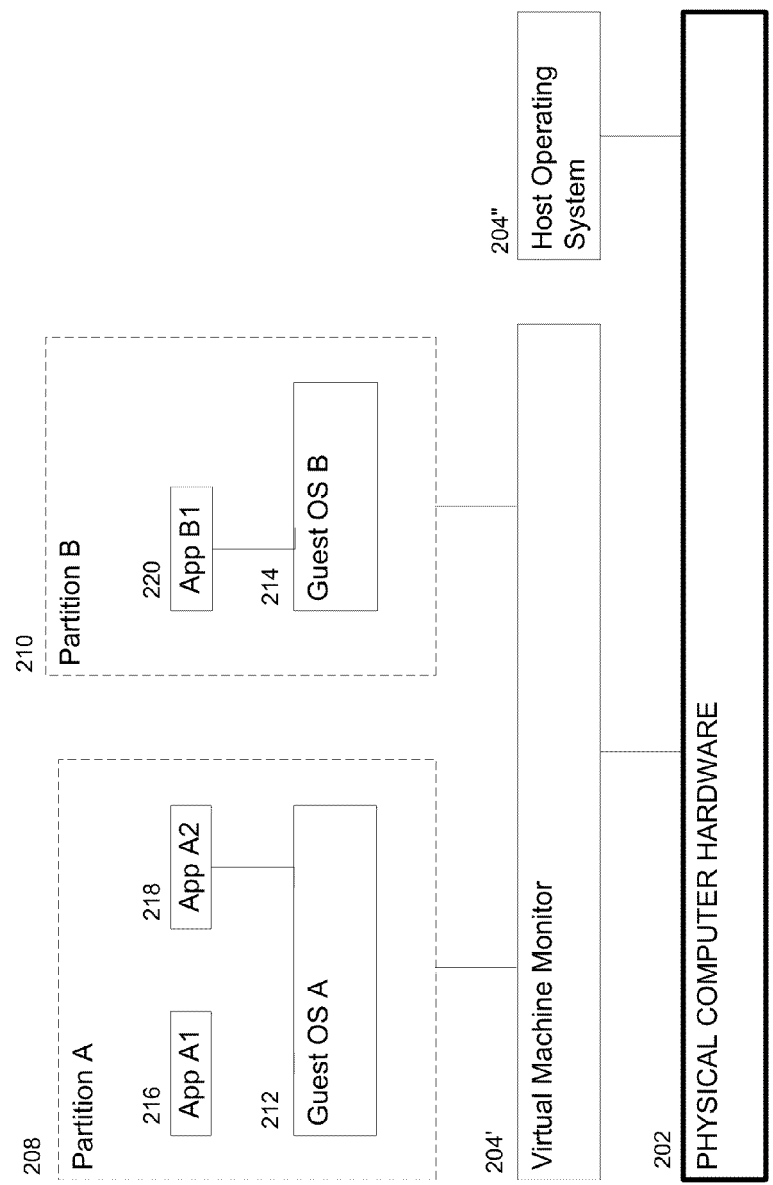
FIG. 2B is a block diagram representing an alternative virtualized computing system wherein the virtualization is performed by a virtual machine monitor running side-by-side with a host operating system.

FIG. 2B illustrates an alternative virtualized computing system wherein the virtualization is performed by a virtual machine monitor (VMM) 204' running alongside the host operating system 204". In certain cases, the VMM 204' may be an application running above the host operating system 204" and interacting with the computer hardware 202 only through the host operating system 204". In other cases, as shown in FIG. 2B, the VMM 204' may instead comprise a partially independent software system that on some levels interacts indirectly with the computer hardware 202 via the host operating system 204" but on other levels the VMM 204' interacts directly with the computer hardware 202 (similar to the way the host operating system interacts directly with the computer hardware). And yet in other cases, the VMM 204' may comprise a fully independent software system that on all levels interacts directly with the computer hardware 202 (similar to the way the host operating system interacts directly with the computer hardware) without utilizing the host operating system 204" (although still interacting with the host operating system 204" in order to coordinate use of the computer hardware 202 and avoid conflicts and the like).

All of these variations for implementing the above mentioned partitions are just exemplary implementations, and nothing herein should be interpreted as limiting the disclosure to any particular virtualization aspect.

Aspects of Virtual Machine Save and Snapshots

With the context of FIGS. 1, 2A, and 2B, in mind, we next turn to various aspects of saving or taking snapshots of virtual machine states (whether they be virtual processor states, virtual device states or any other such states). It should be noted, as these terms are used herein, the saving of a virtual machine entails the preserving of a virtual machines state, followed by the shutting down of a virtual machine. In contrast, taking a snapshot of a virtual machine entails the preserving of a virtual machine state while allowing the virtual machine to continue running after the snapshot has been taken. Those of skill in the art will readily appreciate this distinction, and the various distinctions and the use of terms of art employed herein.

In order to explain the problem solving mechanisms mentioned above, it is instructive to contrast them with prior art mechanisms. Thus, FIG. 3A illustrates a prior art virtual machine save sequence, where the saving of virtual devices and memory requires virtual processors to be stopped and the virtual machine to be shut down. Before point A 300 in time, virtual processors are running. Once a user (or, alternatively, some computing module) decides to save the state of a virtual machine, at point A 300, a virtual processor in the about-to-be-saved virtual machine is stopped (for example, the virtual processor ceases to execute guest instructions). Then, the virtual devices in the virtual machine are asked whether they need more time to process the tasks they are processing—that is, they are asked whether they are still busy. It should be noted, that the virtual devices do not give back any feedback as to how much time they need to become ready to be saved.

Optionally, at point B 302 in time, if a device (or multiple devices) need more time to process their respective tasks, the virtual processors can resume running, and the system implementing the setup of FIG. 3A can ask again, later in time, whether the virtual devices still need more time. This device interrogation sequence may be repeated multiple times until all the devices in a particular virtual machine have stopped processing, and their state is ready to be saved. Thus, at point C 304 in time, virtual devices can begin saving until every virtual device is saved. Once every virtual device is saved, at point D 306 in time, the memory of the virtual machine can start saving. Saving may comprise of first compressing memory and then performing the actual saving of the memory. For example, memory can be saved to some storage facility (RAM, for example). Once both the virtual devices and the virtual machine memory have been saved, the virtual machine can be shut down, as is indicated at point E 308 in time. Importantly, it should be noted that between point C 304 and point E 308, when the virtual devices and virtual machine memory are saving, the virtual processors are stopped. This time may be on the order of a few seconds or even minutes (especially if the virtual machine memory is large), which makes the saving process noticeable and requires of the user to wait until the actual machine shutdown is complete.

In addition to FIG. 3A, FIG. 3B illustrates a prior art virtual machine snapshot sequence, where the saving of the virtual devices and memory requires virtual processors to be stopped, but this time, the virtual machine starts running again after the taking of a snapshot. Points A 300, B 302, C 304, and D 306 are exactly the same as in FIG. 3B. The description provided with reference to FIG. 3A, hence also analogously applies to FIG. 3A. The one difference is that at point E 310 in time, the virtual processors resume running (at point E 308 in time in FIG. 3A, the virtual machine was shut down). What also remains the same between FIGS. 3A and 3B, is that the virtual processors are stopped while virtual devices are saving and while memory is being compressed and saved to storage.

Figure 4A:
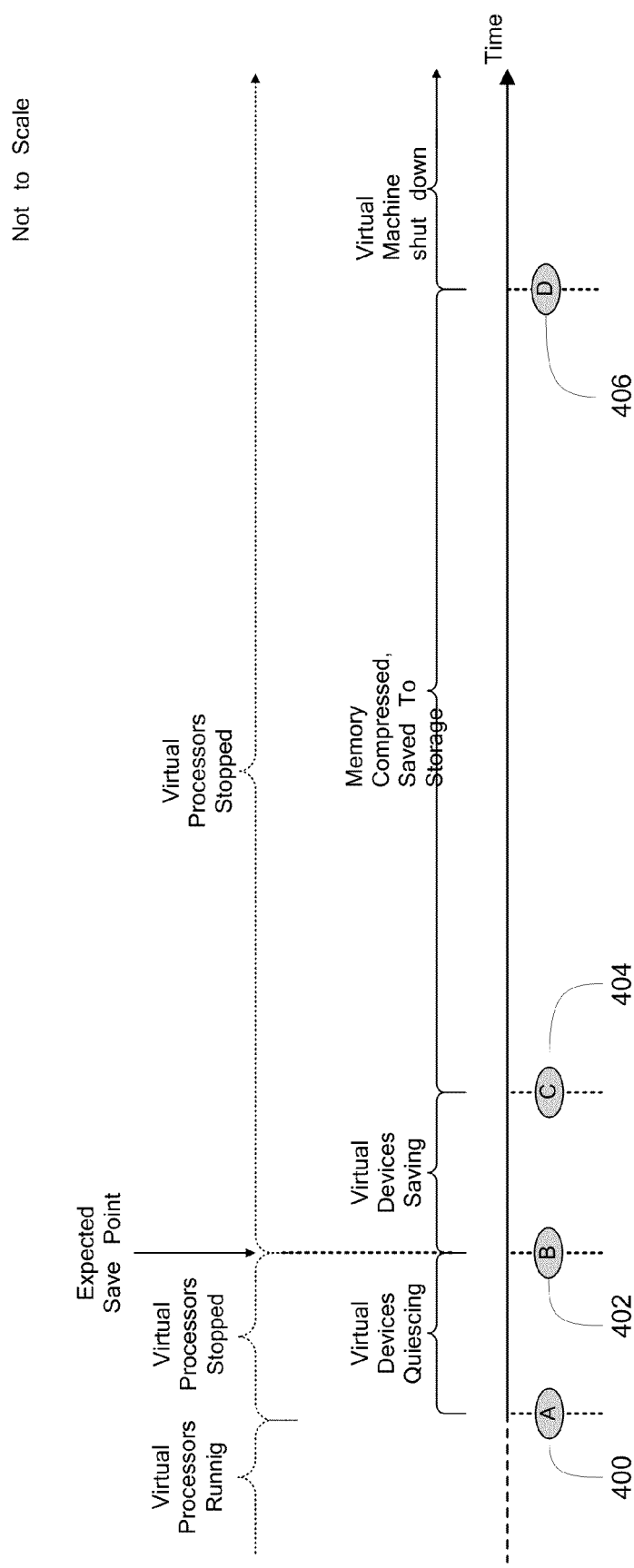
FIG. 4A illustrates a saving technique featured in one aspect of the presently disclosed subject matter, where virtual devices quiesce before an expected save point.

In contrast to the subject matter disclosed with reference to FIGS. 3A and 3B, FIGS. 4A and 4B disclose improved solutions to saving and snapshotting. Thus, specifically, FIG. 4A illustrates a saving technique featured in one aspect of the presently disclosed subject matter, where virtual devices quiesce before an expected save point.

Examining FIG. 4A chronologically, at point A 400, a user may indicate that the state of the virtual machine is to be saved. After a user does this, virtual devices in the virtual machine to-be-saved (anywhere from one to all the virtual machines can be saved) are quiesced. Broadly speaking, quiescing entails the notion of preparing to preserve the state of a virtual machine; specifically, in one non-limiting aspect of the presently disclosed subject matter, quiescing entails the act of completing or canceling all outstanding input/output (I/O) requests.

The quiescing stage, between points A 400 and B 402, can be further utilized to run code within a guest virtual machine. However, care must be taken by the virtual device author to ensure that no dependencies are created upon results from the guest virtual machine. The reason for this is that no guarantee can be given about the state of the virtual machine and the virtual processors therein. In other words, the virtual machine might have crashed or might be about to crash. If virtual device code strictly depended upon results from the guest virtual machine, a control logic process (discussed in more detail, below) might stall if the guest virtual machine's operating system had crashed or was running at a greatly reduced rate.

After the virtual devices have quiesced at point B 402, they can be saved. Similarly, at point C 404, the memory can be compressed and saved to some saved state file. During the time from points B 402 to D 406, when the virtual devices and memory is saving, the processor are stopped. After point D 406, the virtual machine can be shut down.

Figure 4B:
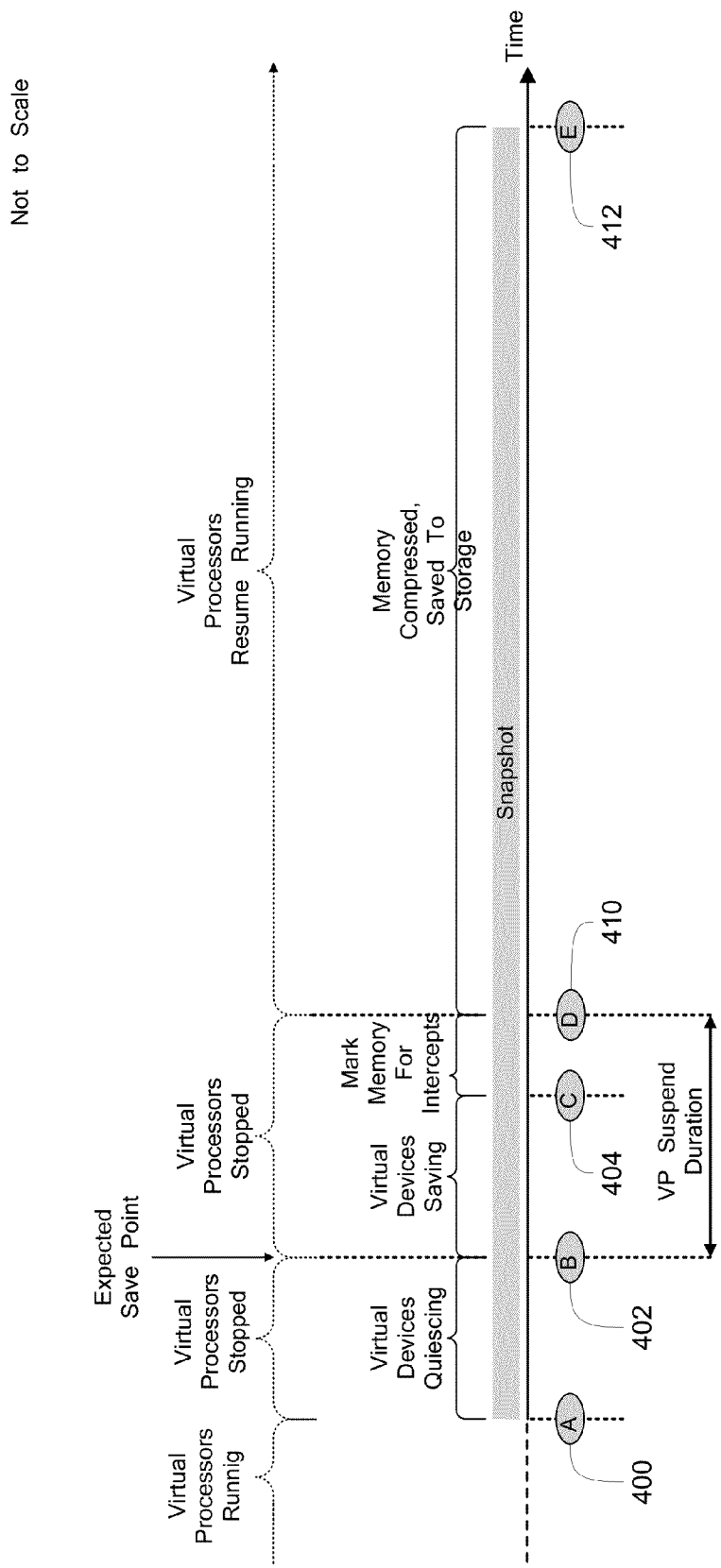
FIG. 4B illustrates a snapshot technique featured in another aspect of the presently disclosed subject matter, where virtual devices quiesce before an expected save point and where memory pages are marked for intercepts, thus allowing virtual processors to resume running while memory is being compressed and saved to storage.

Next, FIG. 4B illustrates a snapshot technique featured in another aspect of the presently disclosed subject matter, where virtual devices quiesce before an expected save point and where memory pages are marked for intercepts, thus allowing virtual processors to resume running while memory is being compressed and saved to storage. Just as in FIG. 4A, at point A 400 a user or computing module can indicate that a snapshot of the state of the virtual machine should be taken. When this indication is made, between points A 400 and B 402, virtual devices are quiescing. Starting at point B 402, virtual devices can be saved (during this time the virtual processors are stopped). However, the virtual processors resume running when the memory of the virtual machine is savings—between points D 410 and E 412.

This resumption of virtual processors while memory is being saved is accomplished by marking memory pages as write protected. Specifically, virtual machine memory can be marked to follow a copy-on-write method. That is, hypervisor intercepts can be attached to every virtual machine memory page such that only a write (but not a read) will cause an intercept. After the virtual processors are allowed to run, at point D 410, a separate thread can handle intercepts caused by virtual processors that touch memory pages. The action taken by the thread is to write the memory data to storage, then allow the virtual processor write to proceed. This may only slightly reduce performance during the time required to save the virtual machine memory.

Figure 8:
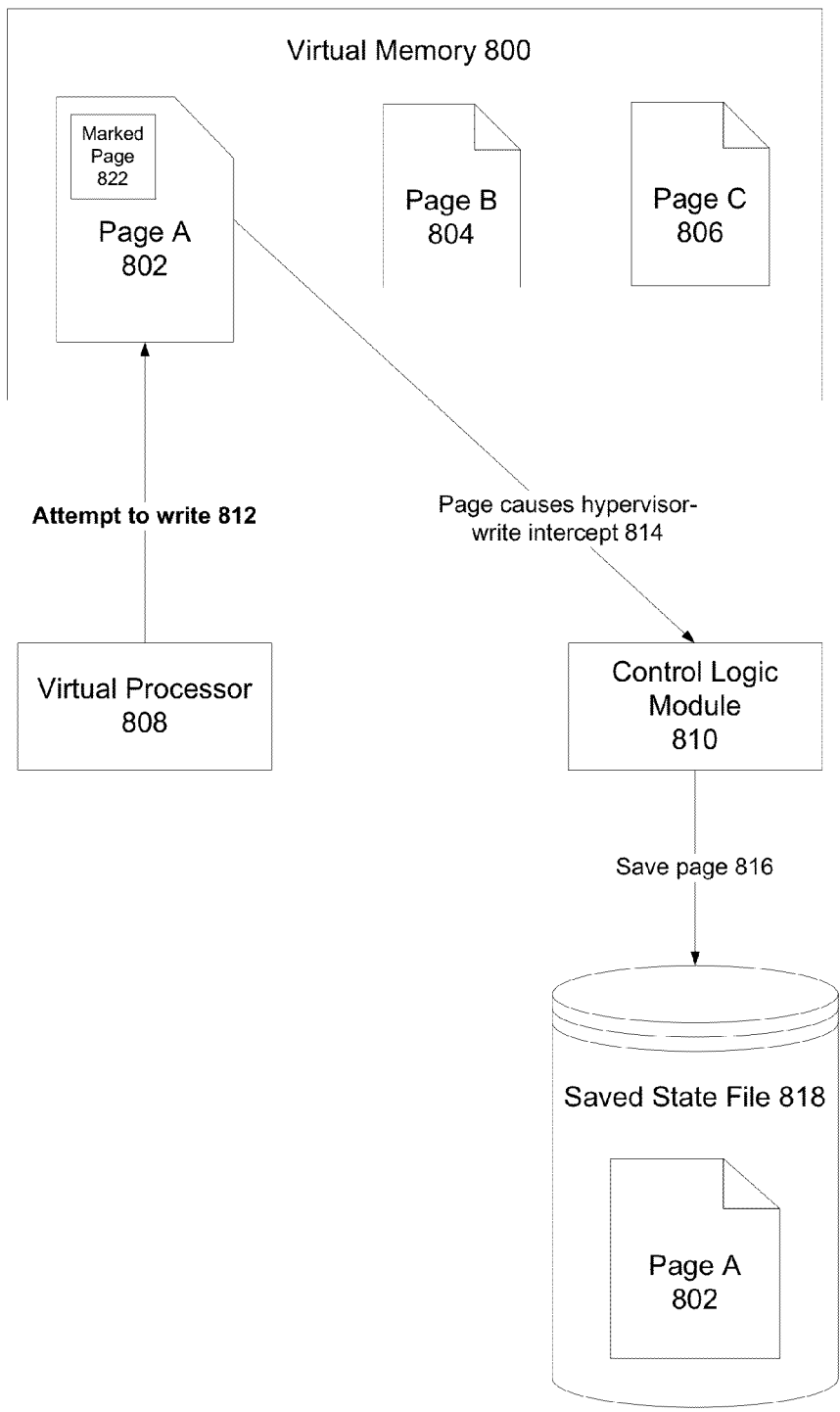

As will be shown in FIG. 8B, this performance degradation can be ameliorated by saving more than just a single memory page per write request—essentially, writing out pages in batches. Put another way, if a virtual processor running code has good locality of reference for writes, a nearby page stands a good chance of causing a write-intercepts in the near future. Predictably, writing the "next" page out as the first hypervisor write-intercept (since the cost to write an extra 4 kilobyte to storage is usually minimal) can cause the performance degradation to be lessened. In short, writing an entire batch or set of pages further causes any performance degradation to be minimal.

Figure 5:
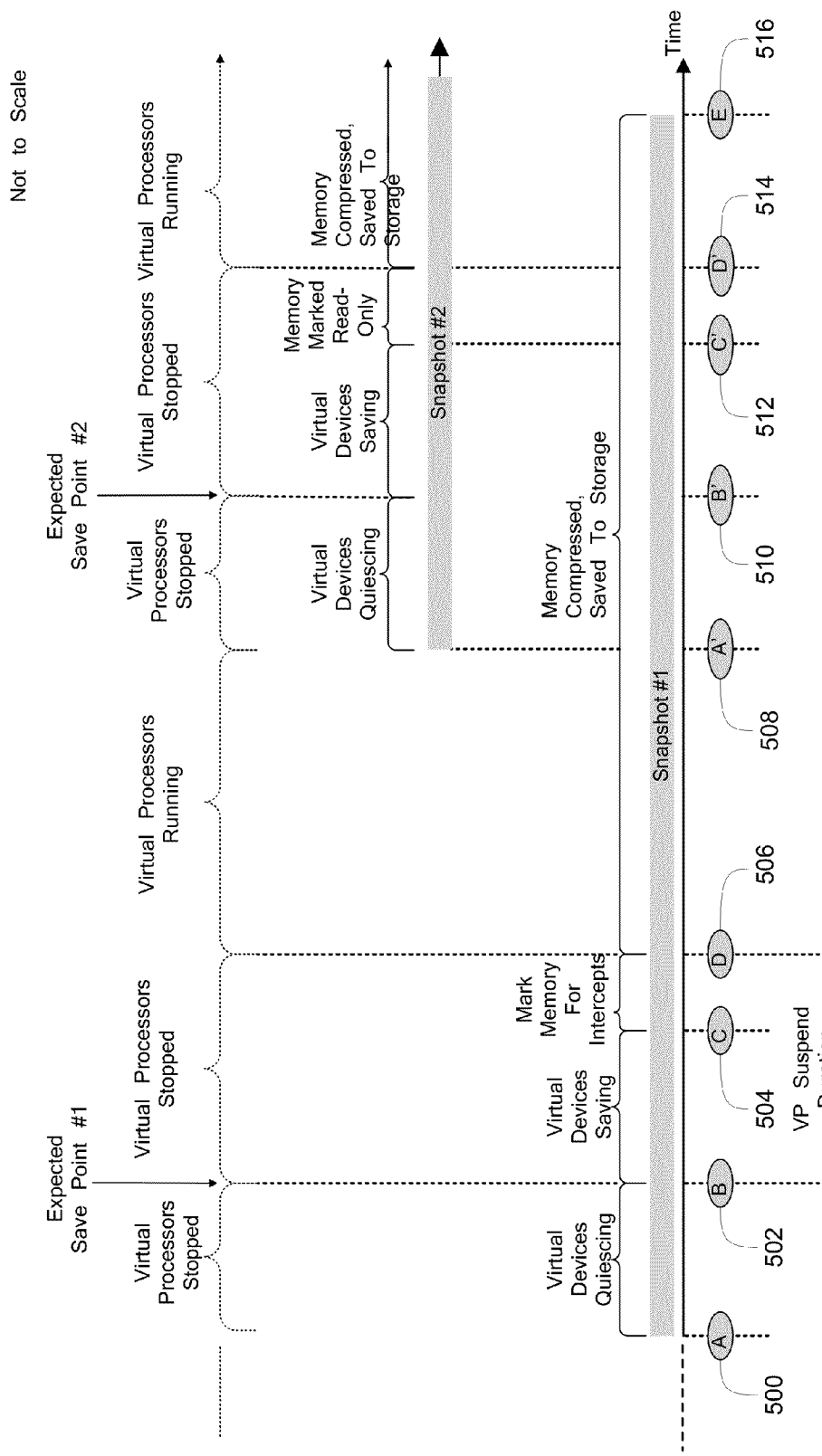
FIG. 5 illustrates the notion that multiple snapshots can be taken with the technique discussed with reference to FIG. 4B.

To further illustrate the wide applicability and far-ranging extension of taking snapshots, FIG. 5 illustrates the notion that multiple snapshots can be taken with the technique discussed with reference to FIG. 4B. At point A 500, an indication is made that a snapshot of a virtual machine (or multiple machines) is to be taken. Between point A 500 and point B 502, the virtual devices (or multiple virtual devices) quiesce in preparation to be saved. At the expected save point #1, i.e., point B 502, virtual devices for this snapshot #1 begin saving up until point C 504. Then, memory pages are marked for intercepts at point C 504. After this, while the virtual processors have resumed running, memory can be compressed and saved to storage. At point D 506, virtual processors are resumed and memory is compressed and saved to storage.

While this memory is being saved to storage, a second snapshot can be taken at point A' 508. Virtual devices will again begin to quiesce up until point B' 510. At the expected save point #2, i.e., point B' 510, virtual devices can begin saving and then memory can be marked as read-only at point C' 512. During this time the virtual processors are stopped. Once memory is marked in this way, it can again be compressed and saved to storage while the virtual processor resume running at point D' 514. All this can happen with respect to the second snapshot while the first snapshot is still underway.

Aspects of Virtual Machine Restore

Figure 6:
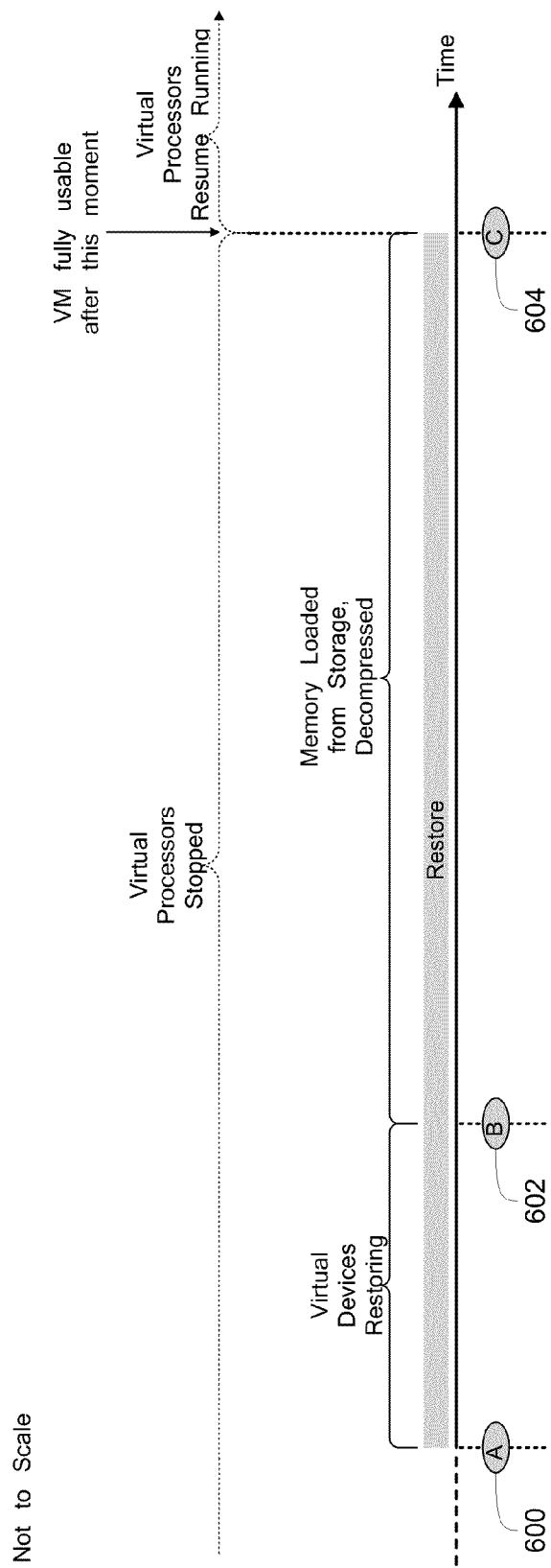
FIG. 6 illustrates a prior art technique for restoring data to a virtual machine that requires that virtual process be stopped while virtual devices and memory is being decompressed and restored.

FIG. 6 illustrates a prior art technique for restoring data to a virtual machine that requires that virtual process be stopped while virtual devices and memory is being decompressed and restored. Per FIG. 6, between points A 600 and B 602, virtual devices are restored from storage. At point B 602, virtual machine memory is loaded from storage and decompressed.

During this time virtual processors are stopped, which means that virtual machines are not fully operable. Only at point C 604, are the virtual machines fully operable (when the virtual processors resume running) Thus, FIG. 6 illustrates the notion that restoring a virtual machine often takes a long time—many seconds to minutes, depending on the amount of memory utilized by a virtual machine.

Figure 7:
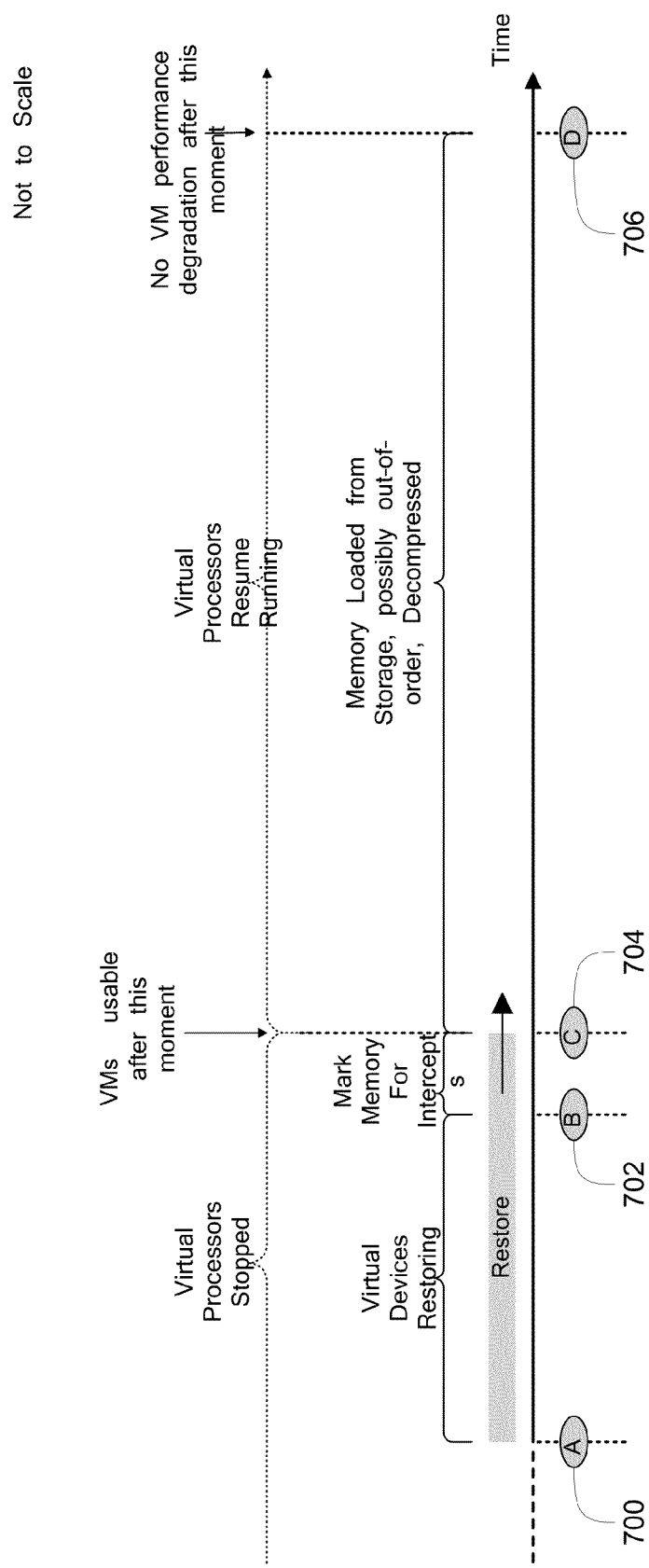
FIG. 7 illustrates a technique for restoring data to a virtual machine that allows virtual processors to resume running while memory is being loaded and decompressed from data storage, possibly out-of-order.

In contrast to FIG. 6, FIG. 7 illustrates a technique for restoring data to a virtual machine that allows virtual processors to resume running while memory is being loaded and decompressed from data storage (possibly out-of-order). First, at point 700, virtual devices are being restored. Then, at point 702, memory pages are marked for intercepts. The result of this marking is that virtual machines become usable after point C 704—i.e., the marking allows for the virtual processors to resume running while memory is being loaded from storage. As more and more pages are restored, virtual machines become increasingly useable between point C 704 and point D 706. And once this process is complete, at point D 706, there is no virtual machine performance degradation.

The marking mechanism in restoring a virtual machine should be distinguished from the marking process in saving or taking a snapshot of a virtual machine. The restore process is optimized by marking all of virtual memory as causing a hypervisor intercept for any read or write (not just write, as discussed with reference to FIG. 4B). Thus, any read or write by, say, a virtual processor, will cause a touched page to be pulled from storage to the virtual machine memory. Allowing for paging in pages that are read from or written to while the memory is being loaded, allows the virtual processors to continue running during the memory loading process as a whole (thus obviating the need to stop such virtual processors, as was discussed with reference to FIG. 6).

Implementation of Virtual Machine Save and Snapshots

FIG. 8A illustrates one exemplary implementation of the presently disclosed subject matter, where a virtual processor 808 attempts to write 812 to a page 802 in memory 800, and where a virtual machine control logic module 810 (which, in one aspect of the present disclosure, may be a module for performing operations such as the copy-on-write method, discussed above and presently) copies such a page 802 to storage 818 before it is modified. This mechanism used by the control logic module 810 is used to save 816 the state of a virtual machine memory while the virtual machine processors continue to run. It allows an instant snapshot that takes no more than a few milliseconds, instead of several minutes if the virtual processors were otherwise stopped.

Each page of the virtual machine memory 800 is marked 822. Page A 802 is representative of such marked pages—the other pages, page B 804 and page C 806 can also be marked (although this is not shown in FIG. 8A). The control logic module 810 has a thread that writes virtual machine memory to a saved state file 818 while virtual processors, such as the illustrated virtual processor 808, continue running. If the virtual processor 808 attempts to write 812 to virtual machine memory, then a hypervisor intercept 814 is generated. The control logic 810 thread handles the intercept 814 and can save 816 page A 802 to a state file 818 (although, it should be noted that pages such as page A 802 can be copied to memory buffers first, to be saved to a persistent storage, such as state file 818, by another thread at a later point). The virtual processor 808 subsequently resumes once the hypervisor intercept is handled. Such running of the virtual processor 808 while at the same time saving virtual machine memory 800 greatly reduces the perception of how long it takes to actually perform a snapshot of the virtual memory 800.

Figure 9:
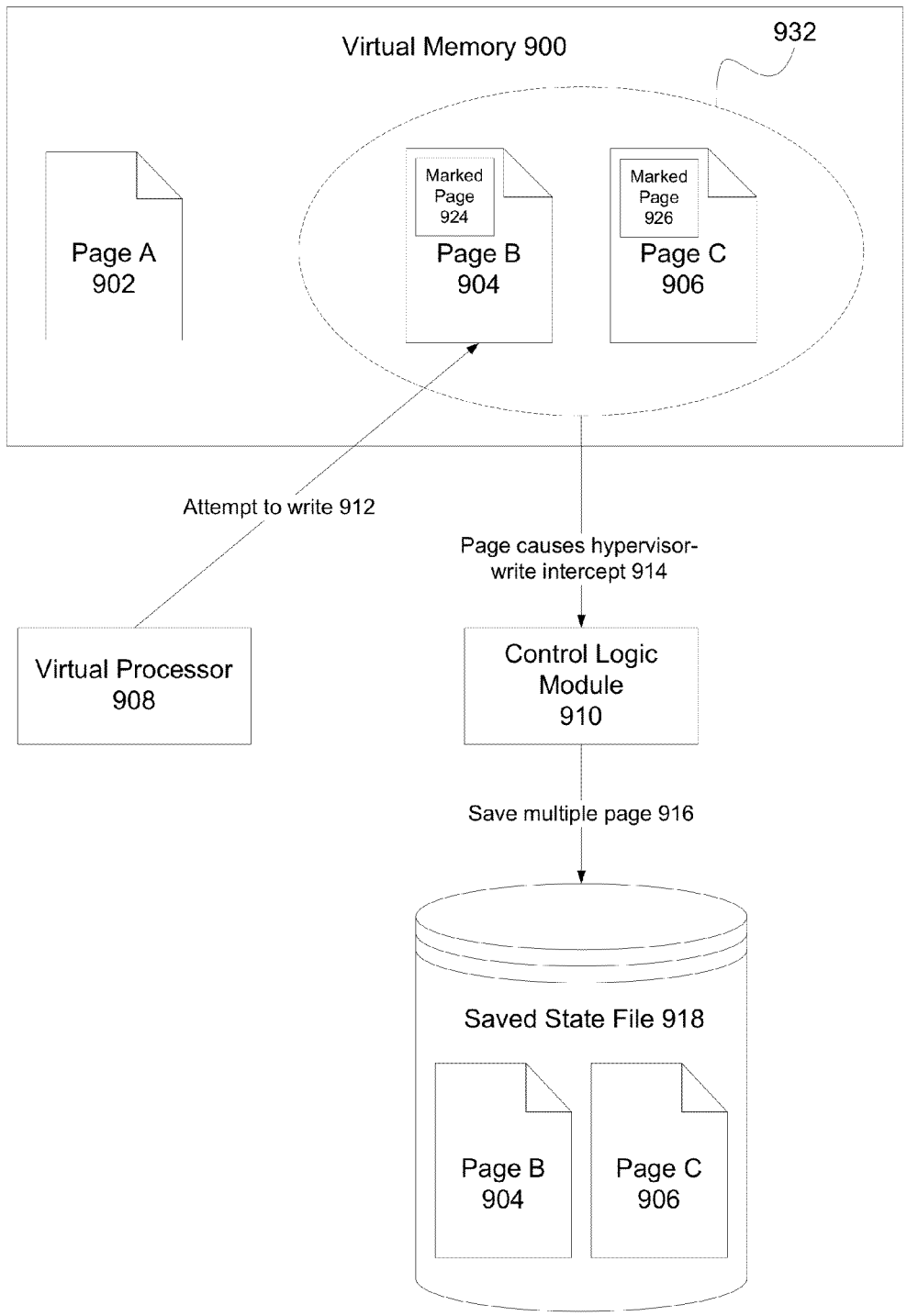
FIG. 9 illustrates that multiple pages (or a batch of pages) can be saved to storage at one time, using the technique described with reference to FIG. 8A, thereby improving the saving (and later restore) mechanisms.

FIG. 9 illustrates that a group 932 of pages (or a batch of pages) can be saved to storage at one time, using the technique described with reference to FIG. 9, thereby improving the saving (and later restore) mechanisms. Thus, per FIG. 9, a virtual processor 908 attempts to write 912 to page B 904. Since page C 906 may be in the proximity of page B 904, or otherwise may be somehow associated with page B 904, it may be written to every time that page B 904 is so written. Thus, it may be advantageous to save both pages 904, 906—even though only page B 904 has been touched by the virtual processor 908. Since page B 904 is marked 924, it will cause a hypervisor-write intercept 914. This intercept 914 may be received by the control logic module 910, which will then save 916 both page B 904 and page C 906 to the state file 918. After such a save, both pages then may be unmarked—that is, requested intercepts of page write or rewrite may be removed.

Figure 10:
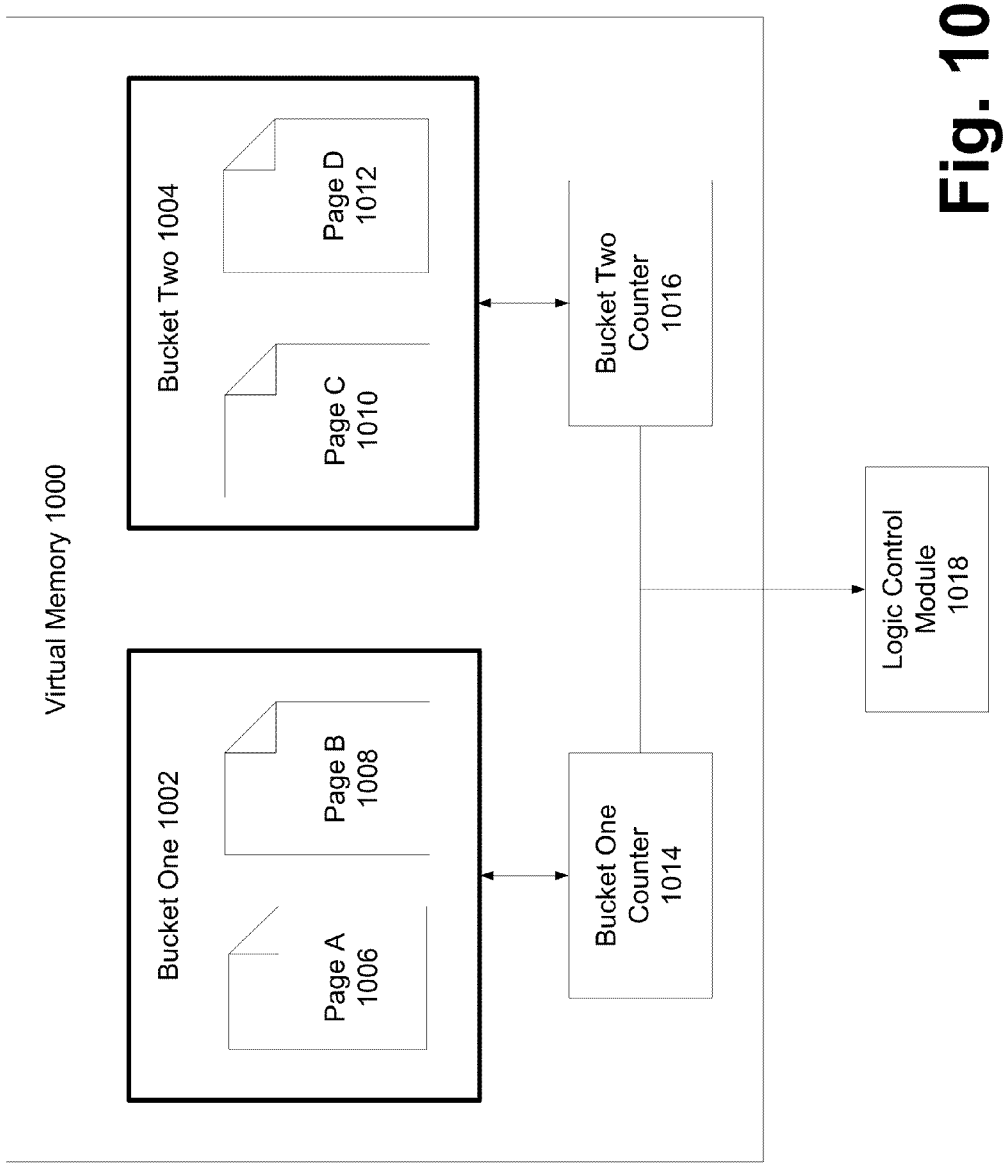
FIG. 10 illustrates a working set optimization for restoring data from a data storage to an allocated virtual machine memory, by using counters assigned on a per-bucket basis.

In another aspect of the presently disclosed subject matter, FIG. 10 illustrates a working set optimization for restoring data from a data storage to an allocated virtual machine memory, by using counters assigned on a per-bucket basis. Virtual machine memory 1000 is sectioned into buckets, for example, bucket one 1002 and bucket two 1004. Per-bucket counters, such as bucket one counter 1014 and bucket two counter 1016, are incremented for every read and/or write. This provides enough data to allow a rudimentary "working set" of pages to be known to the logic control module 1018 at the moment of an expected save point—such as the expected save point, point B 402, illustrated in FIG. 4B. This allows for improvement of performance during a virtual machine restore because the memory most frequently accessed can be decompressed and restored in one large block, rather than waiting for every read or write to memory during restore.

Put another way, per FIG. 10, if page A 1006 in bucket one 1002 is restored, the entire bucket one 1002 contents, which includes also page B 1008, can be restored if the bucket one counter 1014 reaches some predetermined threshold. The same can be done with bucket two 1004 and its corresponding bucket two counter 1016. This is an optimized way to restore data based on which memory pages are touched by virtual processors or virtual devices (i.e. which memory pages are "hot", so that a scatter-gather list can be created to use upon a virtual machine restore).

Figure 11:
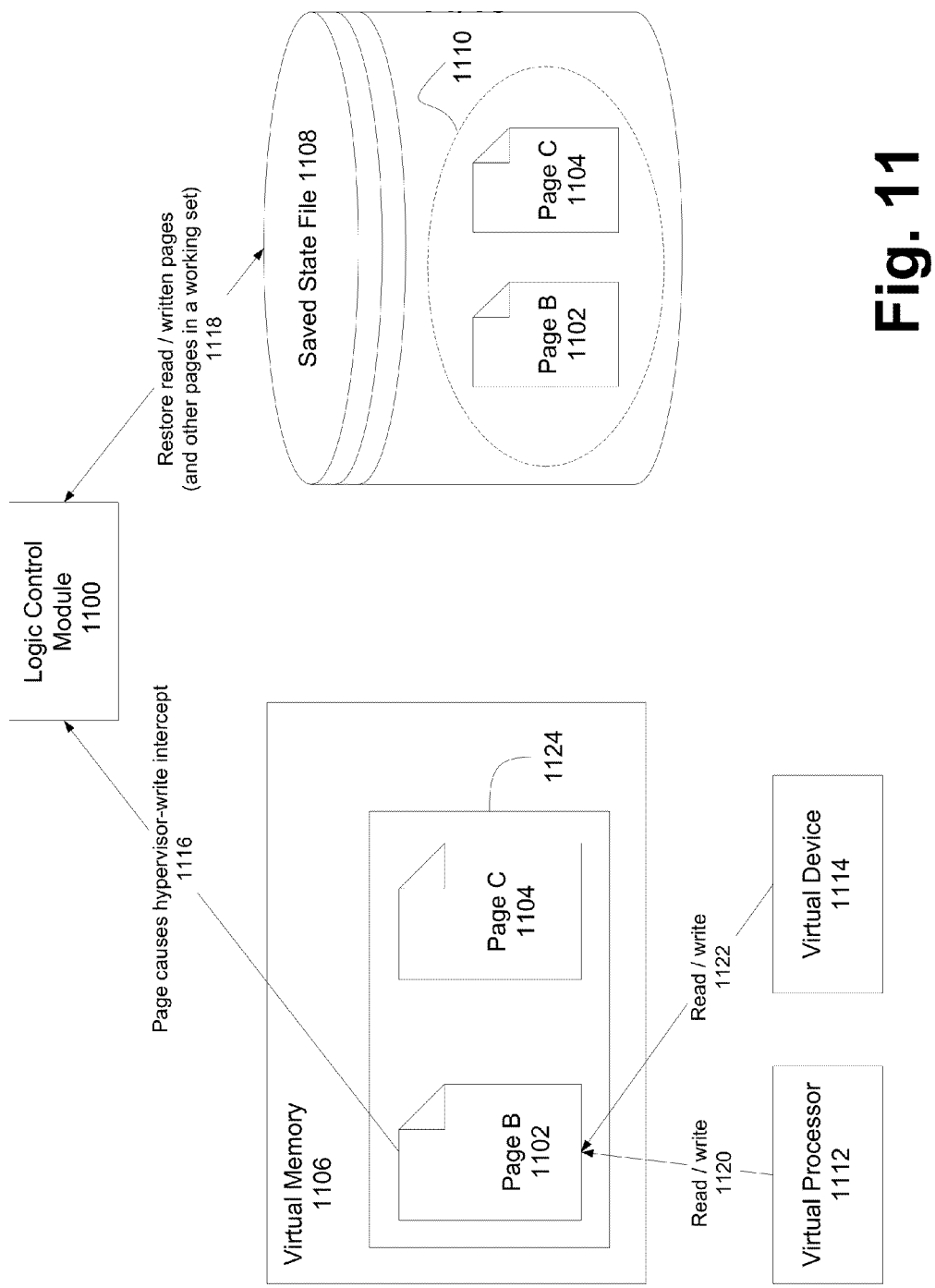
FIG. 11 illustrates one exemplary restoring mechanism available in the presently disclosed subject matter.

In yet another aspect of the presently disclosed subject matter, FIG. 11 illustrates one exemplary restoring mechanism. This mechanism, upon a virtual machine restore, allows for the resuming of virtual processors before all of virtual memory has been decompressed from storage. This, combined with the subject matter discussed with reference to FIG. 10, above, results in a significantly faster resumption of a virtual machine, instead of waiting for potentially many seconds or minutes. In short, this mechanism causes each page of a virtual machine memory to cause a hypervisor intercept on a read or a write. It allows the logic control module to catch every read or write to virtual machine memory, and then decompresses the appropriate memory block data from storage into virtual machine memory.

Turning to FIG. 11, either a virtual processor 1112 or a virtual device 1114 can attempt to read or write to virtual memory 1106. In FIG. 11, page B 1102 is touched. This page 1102 then causes a hypervisor read/write intercept 1116, and the logic control module 1100 receives this intercept 1116. Upon processing this intercept 1116, the page 1102 or a set 1110 of pages (which could include page C 1104) is restored 1118 from the saved state file 1108. This mechanism, as mentioned can allow the virtual processor 1112 to run while virtual memory 1106 is being restored from the saved state file 1108. The only time the virtual processor 1112 is paused is when pages are being retrieved from the state file 1108. Otherwise, a system employing this mechanism can keep retrieving virtual memory 1106 in the background when neither the virtual processor 1112 nor the virtual device 1114 is performing any read or write functionalities.

Figure 12:
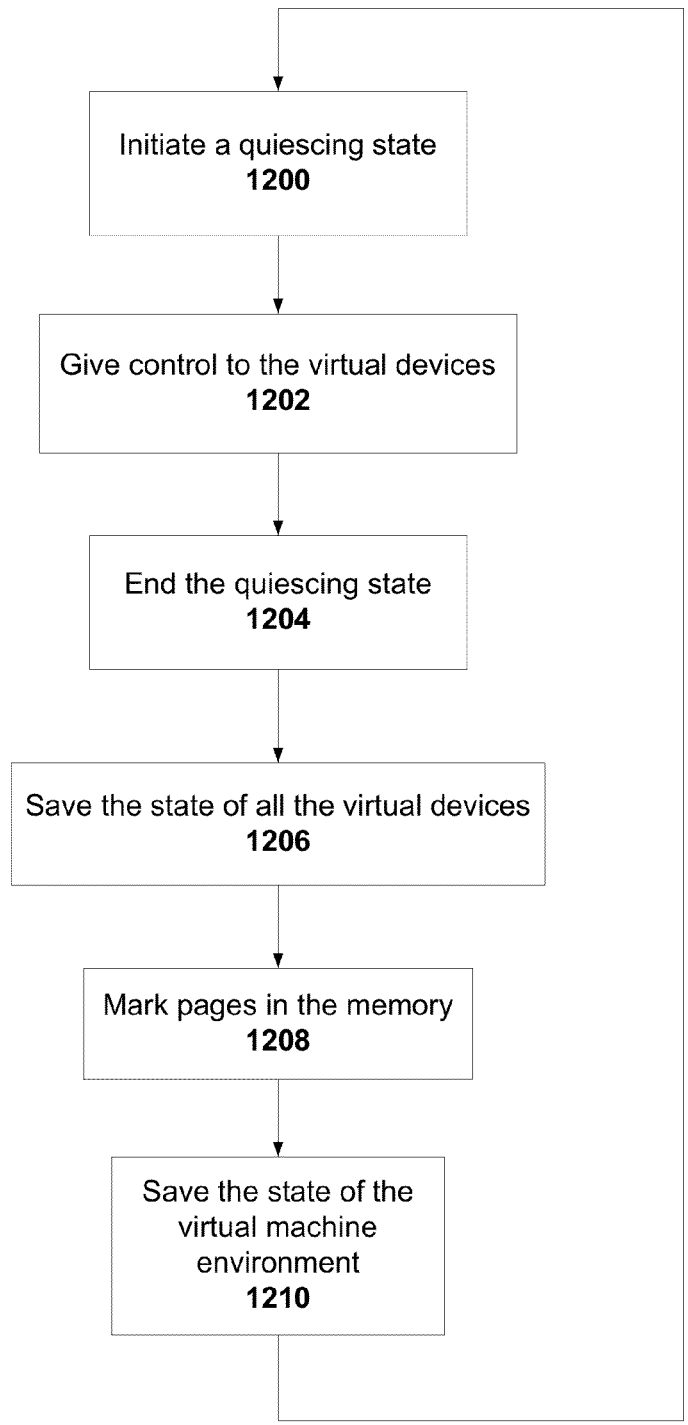
FIG. 12 illustrates in block diagram form one exemplary saving and snapshot method implementation.
Figure 13:
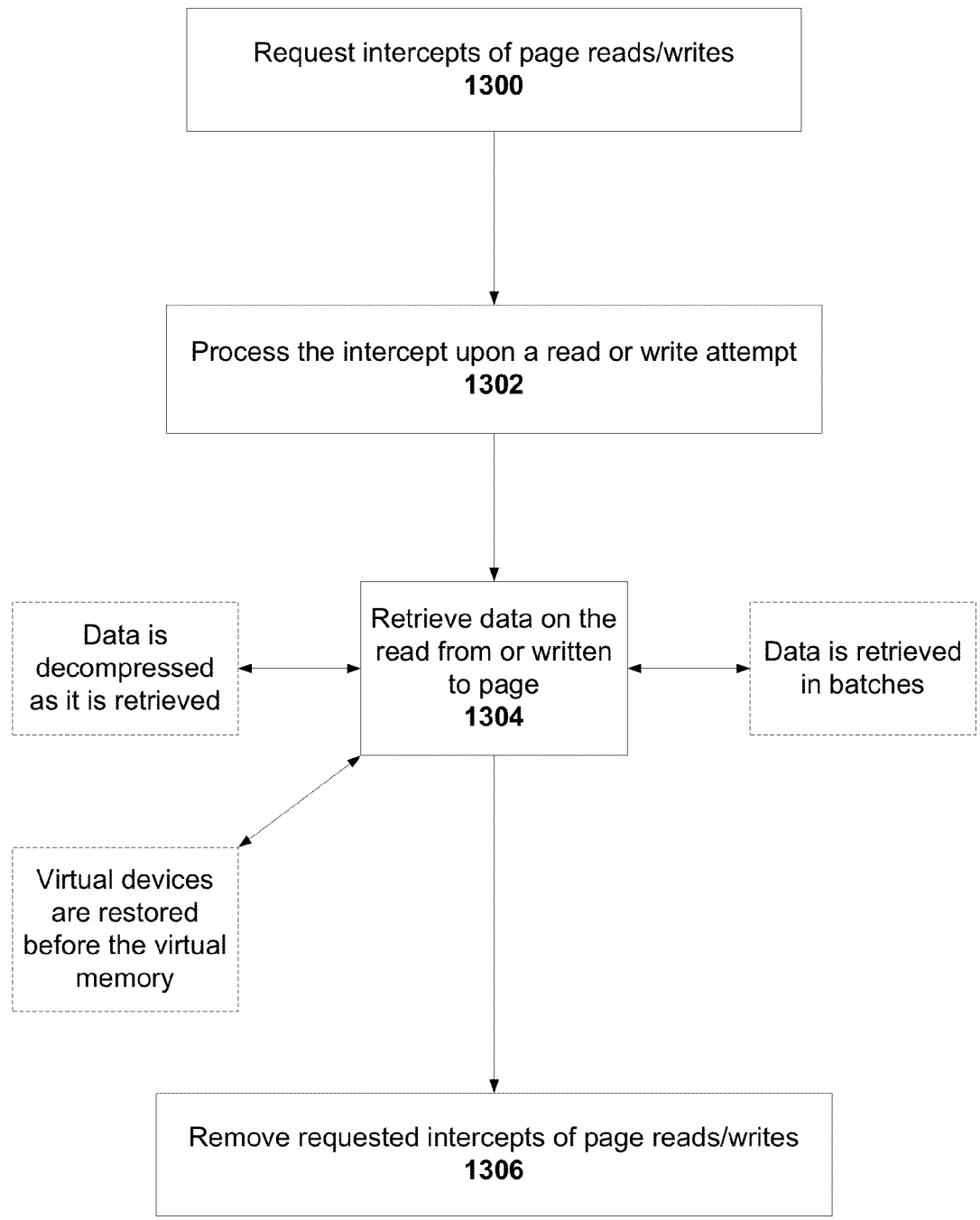
FIG. 13 illustrates in block diagram form one exemplary restoring implementation.

Next, FIGS. 12 and 13 represent in block diagram form saving and restoring flowcharts, respectively. In FIG. 12, per the Figs. discussed above, a general method is illustrated for the saving of the state of virtual devices and memory in a virtual machine environment. At block 1200, a quiescing stage is initiated. The quiescing stage prepares at least one virtual device for the saving of the state of the virtual device.

Next, at block 1202, control is given to the virtual devices. Specifically, this stage comprises of giving control to at least one virtual device, during the quiescing stage, so that any I/O commands can be either completed or cancelled. Once this is accomplished, at block 1204, the quiescing stage can end. This ending is accomplished by having a logic control module prepare to save the state of the at least one virtual device.

After these stages are complete, various other additional stages can be implemented. At block 1206, the state of all virtual devices is actually saved. For example, at block 1210, the state of the virtual machine environment can be saved. To accomplish this task, pages in the virtual memory environment may be marked to cause hypervisor intercepts upon any write attempt. The marking of the pages would typically occur before saving of the memory, as is shown at block 1208.

It is important to note that inherent in the saving stage, block 1210, is the notion that any locked pages will be saved to some state file so that their state is persevered before it is changed (for example, during DMA, as mentioned above). And, moreover, the saving of block 1210 can occur multiple of times and simultaneously, so that multiple snapshots of a virtual machine environment can be taken (as the feedback loop from block 1210 to block 1200 suggests).

Lastly, to complement the saving method described in FIG. 12, FIG. 13 illustrates in block diagram form the restoring method of saved data. At block 1300, a request is made for hypervisor intercepts of page reads/writes. Then, at block 1302, at some later point in time, the hypervisor intercepts are processed with a logic control module upon a read or a write attempt. And finally, at block 1304, data is retrieved from a state file in response to the processing of the hypervisor intercepts, where the data is retrieved during a memory loading stage where any virtual processors associated with the virtual machine environment are running at least part of the time.

Of course, various other steps could be implemented in this method. For example, at block 1306, upon retrieval of the data, the aforementioned intercept requests can be removed. Furthermore, during retrieval of the data from the state file, the data can be decompressed (if it was compressed in the first place) before it is written into the at least one page. Lastly, the data that is retried can be retried in such a way that any virtual devices are restored before any virtual machine memory is restored.

The methods, systems, apparatuses of the present subject matter may also be embodied in the form of program code (such as computer readable instructions) that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, such as that shown in the figure below, a video recorder or the like, the machine becomes an apparatus for practicing the present subject matter. When implemented on a general-purpose processor, the program code combines with the processor to provide a unique apparatus that operates to perform the saving and restoring functionality of the present subject matter.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, state saving and taking snapshots was discussed, along with restoring such preserved state. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A method comprising:
receiving a request to restore a virtual machine to a prior state, the virtual machine comprising at least one virtual processor;
opening a file for the prior state, the file comprising data for a first set of saved pages and data for a second set of saved pages, the data for the first set of saved pages comprising a first counter indicative of operations on a page of the first set of saved pages, the data for the second set of saved pages comprising a second counter indicative of operations on a page of the second set of saved pages;
loading data for the first set into a first one or more pages of memory allocated to the virtual machine based at least in part on determining that the first counter is greater than a threshold;
marking, while the at least one virtual processor is stopped, a second one or more pages of memory allocated to the virtual machine to cause hypervisor intercepts for any read or write attempt on the second one or more pages based at least in part on determining that the second counter is less than the threshold; and
loading, while the at least one virtual processor is executing, data for a first saved page of the second set into a corresponding page of the second one or more pages in response to a hypervisor intercept on the corresponding page of the second one or more pages.

2. The method of claim 1, further comprising:
unmarking the corresponding page of the second one or more pages to remove hypervisor intercepts on the corresponding page.

3. The method of claim 1, wherein operations on the page of the first set of saved pages correspond to read or write operations.

4. The method of claim 1, wherein the first set of saved pages is compressed, further comprising:
decompressing the first set of saved pages.

5. The method of claim 1, further comprising:
loading a state of a virtual device prior to executing the virtual processor.

6. The method of claim 1, further comprising:
loading data for a second saved page of the second set in response to loading data for the first saved page of the second set.

7. The method of claim 1, further comprising:
incrementing the counter indicative of operations in response to an operation being performed on a page of the first set of saved pages.

8. A memory device comprising computer readable instructions that, upon execution by a computing device, cause the computing device at least to:
receive a request to restore a virtual machine to a prior state, the virtual machine comprising at least one virtual processor;
open a file for the prior state, the file comprising data for a first set of saved pages and data for a second set of saved pages, the data for the first set of saved pages comprising a first counter indicative of operations on a page of the first set of saved pages, the data for the second set of saved pages comprising a second counter indicative of operations on a page of the second set of saved pages;
load data for the first set into a first one or more pages of memory allocated to the virtual machine based at least in part on determining that the first counter is greater than a threshold;
mark, while the at least one virtual processor is stopped, a second one or more pages of memory allocated to the virtual machine to cause hypervisor intercepts for any read or write attempt on the second one or more pages based at least in part on determining that the second counter is less than the threshold; and
load, while the at least one virtual processor is executing, data for a saved page from the second set into a corresponding page of the second one or more pages in response to a hypervisor intercept on the corresponding page of the second one or more pages.

9. The memory device of claim 8, comprising further instructions that, upon execution by the computing device, cause the computing device to at least:
unmark the corresponding page of the second one or more pages to remove hypervisor intercepts on the corresponding page.

10. The memory device of claim 8, wherein operations on the page of the first set of saved pages correspond to read or write operations.

11. The memory device of claim 8, comprising further instructions that, upon execution by the computing device, cause the computing device to at least:
decompress the first set of saved pages.

12. The memory device of claim 8, comprising further instructions that, upon execution by the computing device, cause the computing device to at least:
load a state of a virtual device prior to executing the virtual processor.

13. The memory device of claim 8, comprising further instructions that, upon execution by the computing device, cause the computing device to at least:
begin executing the virtual processor subsequent to marking the second one or more pages of memory.

14. A memory device comprising computer readable instructions that, upon execution by a computing device, cause the computing device at least to:
stop running a virtual processor of a virtual machine, the virtual machine comprising a virtual device;
save a state of the virtual device upon completing, while the virtual processor of the virtual machine is stopped, a pending input output command of the virtual device;
resume running the virtual processor;
intercept a write operation directed to a first page of memory allocated to the virtual machine; and
store, in response to intercepting the write operation, data indicative of a group of pages of memory allocated to the virtual machine comprising the first page and a second page, the data further comprising information indicative of counts of operations that have been performed on at least the first page and the second page.

15. The memory device of claim 14, comprising further instructions that, upon execution by the computing device, cause the computing device to at least:
copy, in response to the write operation directed to the first page, the group of pages allocated to the virtual machine.

16. The memory device of claim 14, comprising further instructions that, upon execution by the computing device, cause the computing device to at least:
select a third page for inclusion in the group of pages based at least in part on locality of reference with the first page.

17. The memory device of claim 14, wherein storing the first page comprises compressing the first page.

18. The memory device of claim 14, comprising further instructions that, upon execution by the computing device, cause the computing device to at least:
form a subset of pages of memory allocated to the virtual machine;
increment a first counter corresponding to the subset of pages in response to a read or write operation being performed on a page of the subset of pages; and
restore the subset of pages when the first counter is greater than a threshold.

19. The memory device of claim 14, comprising further instructions that, upon execution by the computing device, cause the computing device to at least:
remove, in response to the first page of memory allocated to the virtual machine having been stored, a request to intercept write operations directed to the first page of memory allocated to the virtual machine.

20. The memory device of claim 14, comprising further instructions that, upon execution by the computing device, cause the computing device to at least:
identify a working set of pages based at least in part on counters incremented in response to read and write operations, the working set of pages associated with a save point.

* * * * *